United States Patent
Masaki et al.

[11] 3,855,975
[45] Dec. 24, 1974

[54] WARMING-UP APPARATUS FOR INTERNAL COMBUSTION ENGINE

[75] Inventors: Kenji Masaki; Yukihiro Etoo, both of Yokohama, Japan

[73] Assignee: Nissan Motor Company Limited, Yokohama, Japan

[22] Filed: Jan. 24, 1973

[21] Appl. No.: 326,267

[30] Foreign Application Priority Data
Jan. 25, 1972  Japan.................................. 47-9369
Jan. 25, 1972  Japan.................................. 47-9370

[52] U.S. Cl. ........ 123/41.13, 123/41.12, 123/179 B, 123/179 BG
[51] Int. Cl. ............................................. F01p 7/02
[58] Field of Search ....... 123/179 B, 179 BG, 41.12, 123/41.13

[56] References Cited
UNITED STATES PATENTS

| | | | |
|---|---|---|---|
| 2,791,699 | 5/1957 | Taylor | 123/179 B |
| 2,876,754 | 3/1959 | Obermaier | 123/117 A |
| 2,952,782 | 9/1960 | Woyden | 123/179 B |
| 3,040,724 | 6/1962 | Kennemer | 123/179 B |
| 3,090,195 | 5/1963 | Fisher | 123/41.13 |
| 3,177,852 | 4/1965 | Elmer | 123/41.12 |
| 3,180,325 | 4/1965 | Neuhauser | 123/41.12 |
| 3,323,596 | 6/1967 | Mobius | 123/41.12 |
| 3,739,760 | 3/1972 | Charron | 123/41.13 |

*Primary Examiner*—Manuel A. Antonakas
*Assistant Examiner*—Daniel J. O'Connor
*Attorney, Agent, or Firm*—Robert S. Auten

[57] ABSTRACT

A warming-up apparatus adapted for warming up an internal combustion engine when the engine is running cold or being warmed up, which apparatus is arranged to stop operations of a cooling fan and a water pump of the engine, to retard the ignition timing of the engine and to increase the opening degree of a carburetor throttle valve, concurrently, when the temperature of the coolant is below a predetermined level for thereby effecting faster warm-up of the engine.

6 Claims, 6 Drawing Figures

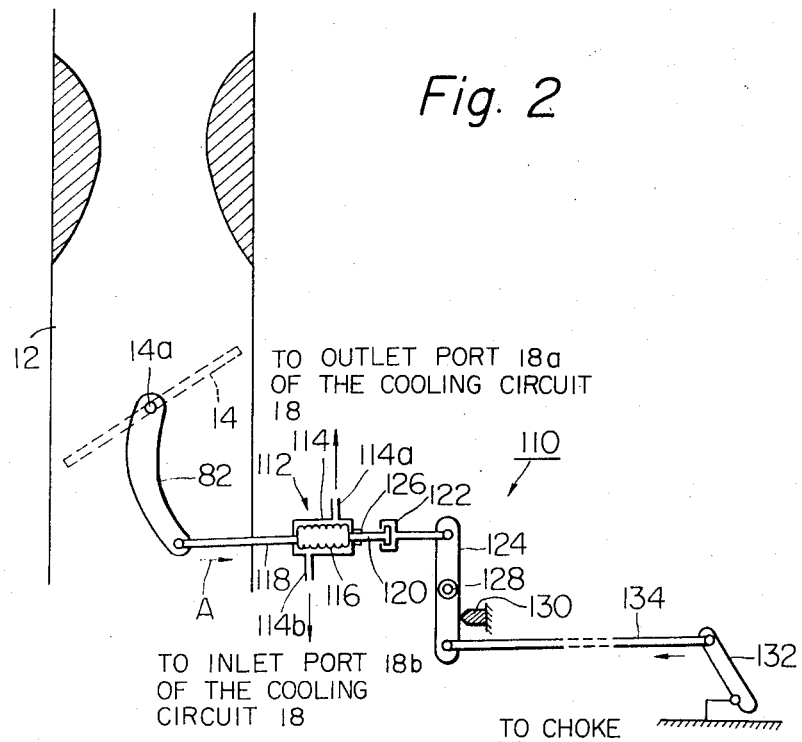
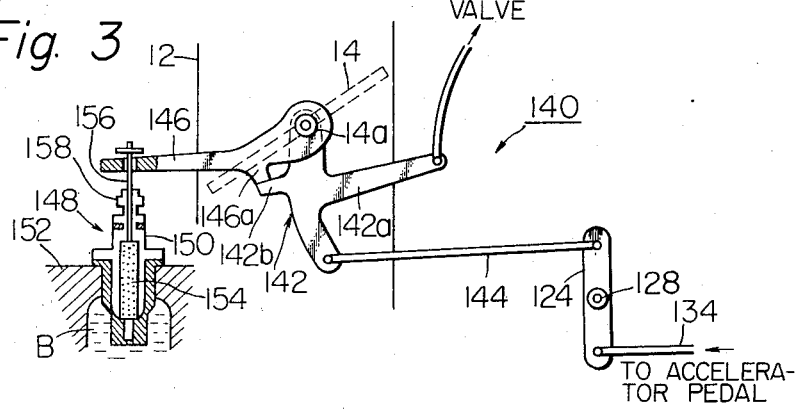

WARMING-UP APPARATUS FOR INTERNAL COMBUSTION ENGINE

This invention relates to internal combustion engines and, more particularly, to a warming-up system which is specifically adapted to rapidly warm up the internal combustion engine when the engine is running cold or being warmed up.

An object of the present invention is to provide a warming-up system for an internal combustion engine which system is adapted to warm up the engine in a significantly shortened period after the engine is started.

Another object of the present invention is to provide a warming-up system for an internal combustion engine which system is adapted to rapidly warm up the engine after the engine is started for thereby increasing the performance efficiency of the engine while decreasing concentrations of noxious and harmful compounds in exhaust gases emitted from the engine.

Still another object of the present invention is to provide a warming-up system for an internal combustion engine which system is simple in construction and economical to manufacture.

These and other features and advantages of the present invention will become more apparent from the following description when taken in conjunction with the accompanying drawings in which like or corresponding component parts are designated by same reference numerals and in which:

FIG. 2 is a schematic view illustrating a modified form of a throttle actuating mechanism forming part of the warming-up system shown in FIG. 1;

FIG. 3 is a schematic view illustrating another modified form of the throttle actuating mechanism forming part of the warming-up system shown in FIG. 1;

Figure 1:
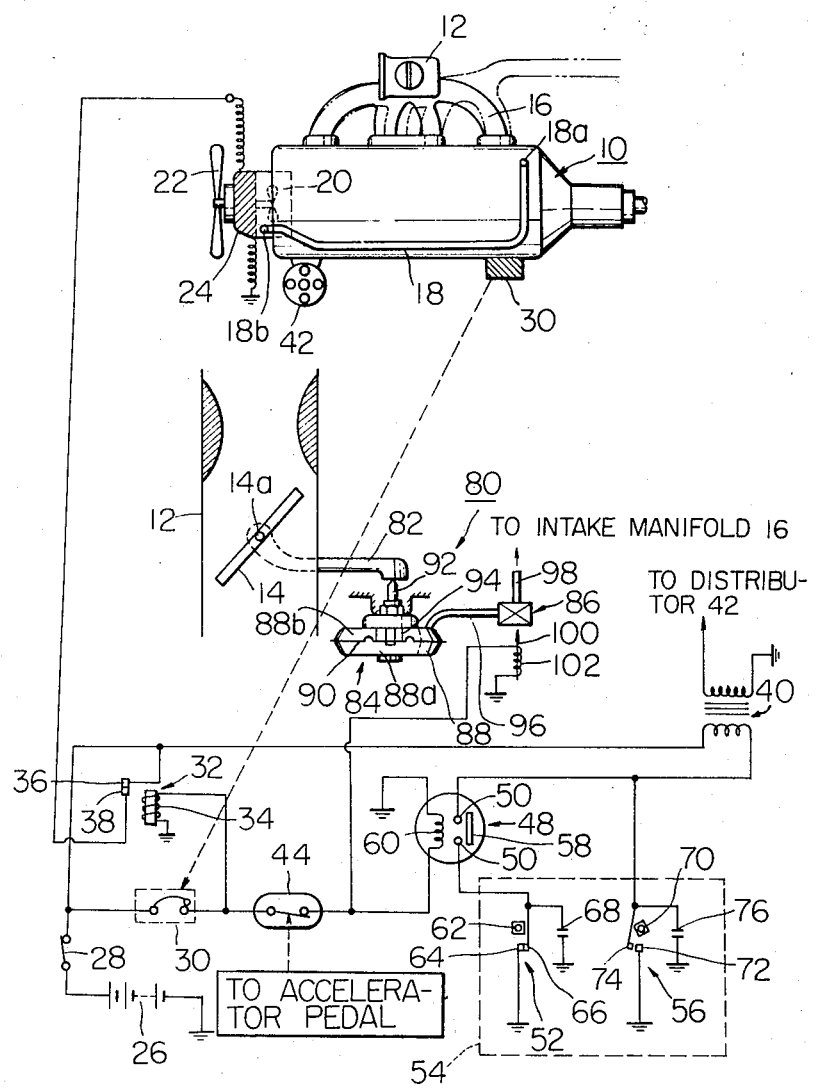
FIG. 1 is a schematic view illustrating a preferred embodiment of the warming-up system according to the present invention, the warming-up system being shown as incorporated in an internal combustion engine.

Referring now to FIG. 1, there is schematically shown a preferred embodiment of the warming-up system for an internal combustion engine which is generally represented by reference numeral 10. The internal combustion engine 10 has, as customary, a carburetor 12 provided with a throttle valve 14, an intake manifold 16 leading from the carburetor 12, and an exhaust manifold (not shown). The engine 10 also has a cooling system which includes a cooling circuit 18 which is branched off from the engine 10 through an outlet port 18a and leads to a water pump 20 through an inlet port 18b. The water pump 20 serves to have the coolant circulated and recirculated through the cooling circuit 18 so as to cool the hot engine during operations. The construction and arrangement of such cooling circuit per se is well known and, therefore, a detailed discussion thereof is herein omitted. Indicated at reference numeral 22 is a cooling system fan which, when it is rotated, serves to cool down the temperature of a radiator (not shown) and of the engine.

The present invention features a provision of a warming-up apparatus which is arranged to stop the cooling system from operating by stopping the water pump 20 and the cooling fan 22 from running, to retard the ignition timing and to increase the engine speed by increasing the opening degree of the throttle valve 14 mounted in the carburetor 12 thus increasing an air-fuel mixture, flow into the engine when the engine 10 is being warmed up, for thereby warming up the engine 10 in a significantly shortened period after the engine is started to increase performance efficiency of the engine while decreasing the concentrations of noxious and harmful compounds contained in exhaust gases emitted from the engine. To this end, the warming apparatus comprises an electro-magnetic clutch 24 which is operatively connected to the water pump 20 and the cooling fan 22 and serves to stop operations of the water pump 20 and the cooling fan 22 when the electro-magnetic clutch 24 is engaged. The electro-magnetic clutch 24 may be of any suitable construction and, therefore, detail discussion of the same is herein omitted. This electro-magnetic clutch 24 is controlled by an electric circuit shown in FIG. 1. The electric circuit includes a source of d.c. voltage supply or battery 26 which is electrically connected to an ignition switch 28 which in turn is electrically connected to an engine temperature responsive switch 30. The engine temperature responsive switch 30 may be mounted on the body of the engine 10 so as to respond to the variations in the temperature of the coolant in the water jacket of the engine by means of, for example, a thermostatic member (not shown). The engine or coolant temperature responsive switch 30 is closed when the temperature of the coolant is lower than a predetermined level which may be about 25°C. As shown, a relay switch 32 is provided in the electric circuit. The relay switch 32 includes a solenoid 34 having one terminal electrically connected to the coolant temperature responsive switch 30 and the other terminal connected to the ground, a movable contact 36 adapted to be opened and closed by the solenoid 34 and connected to the battery 26 through the ignition switch 28, and a stationary contact 38 which is electrically connected to the electro-magnetic clutch 24. The movable contact 36 of the relay switch 32 is also electrically connected to an ignition coil 40 which in turn is electrically connected to a distributor 42 (connection not shown). Indicated by reference numeral 44 is an idling switch which is operatively connected to an acceleration control member 132 (FIG. 2). The idling switch 44 is arranged to be closed when the acceleration control member is completely released and opened when the acceleration control member is depressed even slightly. The idling switch 44 is electrically connected to a timer relay 48. The timer relay 48 comprises two stationary contacts 50, one of the stationary contacts being electrically connected to a primary side of the ignition coil 40 whereas the other stationary contact is electrically connected to a retarding breaker contact assembly 52 of an ignition timing change over device 54 in which an advancing breaker contact assembly 56 is provided, a movable contact 58, and a coil 60 having one terminal electrically connected to the coolant temperature responsive switch 30 through the idling switch 44.

The ignition timing change over device 54 forms a part of the warming-up apparatus according to the present invention and functions to retard the ignition timing to facilitate faster warm-up of the engine when the coolant temperature responsive switch 30 is closed. As previously noted, the ignition timing change over device 54 includes the retarding breaker contact assembly 52 and the advancing breaker contact assembly 56. The retarding breaker contact assembly 52 includes a breaker cam 62, a stationary contact 64 connected to the ground, and a movable contact 66 connected to one of the stationary contacts 50 of the timer relay 48. The movable contact 66 is also connected to a condenser 68 having one end connected to the ground. Likewise, the advancing breaker contact assembly 56 includes a breaker cam 70, a stationary contact point 72 connected to the ground, and a movable contact 74 directly connected to the primary side of the ignition coil 40. The movable contact 74 is also connected to a condenser 76 having one end connected to the ground.

The warming-up system of the present invention also comprises a throttle opening device 80 for increasing the opening degree of the throttle valve 14 when the temperature of the cooling water is below a predetermined level. In the illustrated embodiment of FIG. 1, the throttle opening device 80 is shown as comprising a throttle operating lever 82 fixedly connected to a rotatable shaft 14a of the throttle valve 14, a diaphragm assembly 84 for controlling the throttle operating lever 82, and a solenoid control valve 86.

The diaphragm assembly 84 includes a diaphragm housing 88, in which a flexible diaphragm member 90 is disposed which devides the housing 88 into first and second chambers 88a and 88b. A movable plunger 92 is operatively connected to the flexible diaphragm member 90 and abutting on one end of the throttle operating lever 82. The diaphragm member 90 is biased downwardly of the drawing by means of a compression spring 94 so that the throttle operating lever 82 is rotated clockwise to decrease the opening degree of the throttle valve 14. The second chamber 88b of the diaphragm assembly 84 communicates with a conduit 96 which in turn communicates through a conduit 98 with the intake manifold 16 of the engine 10. The solenoid control valve 86 is interposed between the conduits 96 and 98 and controls communication therebetween.

The solenoid control valve 86 may be of any known construction and in the illustrated embodiment, comprises a movable plunger 100 adapted to control communication between the conduits 96 and 98, and a solenoid coil 102 having one end electrically connected to the battery 26 through the ignition switch 28, the coolant temperature responsive switch 30 and the idling switch 44 of the electric circuit described hereinabove. The solenoid 102 moves the plunger 100 toward a position to establish communication between the conduits 96 and 98 when it is energized. It should be appreciated that the throttle opening device 80 is shown as being of the type which is controlled by the electric circuit shown in FIG. 1, but may be constructed in a manner as will be described hereinafter in connection with FIGS. 2 and 3.

Before entering into detail discussion of the warming apparatus shown in FIG. 1, it is assumed that the ignition switch 28 is closed and the accelerator pedal 132 is maintained released to cause the idling switch 44 to be closed. If, in this instance, the temperature of the coolant is below a predetermined level, then the coolant temperature responsive switch 30 is closed. Under this condition, the electric path for the solenoid 34 of the relay switch 32 is completed so that the movable contact 36 is moved downwardly, as viewed in FIG. 1, by the solenoid 34 and, therefore, the relay 32 is closed. Consequently, the electro-magnetic clutch 24 is engaged to stop operations of the water pump 20 and the cooling fan 22. In this condition, the cooling function of the cooling fan 22 is prevented and the coolant is prevented from being circulated and recirculated through the cooling circuit 18. Thus, the heat due to combustion of an air-fuel mixture in the engine cylinder is transferred through the body of the engine 10 to the coolant in the cooling circuit. Since, at the same time, an electric current is supplied to the timer relay 48, the timer relay 48 is closed by the action of the solenoid 60, and the retarding breaker contact assembly 52 is actuated to retard the ignition timing of the engine for effecting faster warm-up of the engine. On the other hand, the solenoid coil 102 of the solenoid control valve 86 is energized so that the plunger 100 is moved to a position for the valve to provide communication between the conduits 96 and 98. Under this condition, intake manifold vacuum is supplied from the intake manifold 16 to the second chamber 88b of the diaphragm assembly 84. In this instance, the diaphragm member 90 is moved upwardly of the drawing against the force of the compression spring 94 thereby causing the movable plunger 92 to rotate the throttle operating lever 82 counterclockwise. Consequently, the degree of opening of the throttle valve 14 is increased so that the amount of air-fuel mixture supplied to the engine cylinder is increased and the rotational speed of the engine is increased. It should be noted in this instance that an after-burning effect is facilitated in the engine cylinder due to the retarded ignition timing and the increased amount of air-fuel mixture supplied to the engine cylinder whereby the engine and accordingly the coolant are warmed up in a significantly shortened period after the engine has been started. It will also be noted that by faster warm-up of the engine the performance efficiency of the engine is increased while the concentrations of noxious and harmful compounds in the engine exhaust gases are satisfactorily eliminated.

As the temperature of the coolant reaches the predetermined level, the coolant temperature responsive switch 30 opens. Consequently, the solenoid coil 34 of the relay switch 32 is de-energized so that the relay switch 32 opens thereby dis-engaging the electro-magnetic clutch 24. In this condition, the water pump 20 is operated so as to circulate and recirculate the coolant through the cooling circuit 18 and the cooling fan 22 is rotated for cooling the radiator (not shown) of the engine 10. At the same time, the timer relay 48 opens to render the retarding breaker contact assembly 52 inoperative and, therefore, the advancing breaker contact assembly 56 serves to advance the ignition timing of the engine. Since, at this instant, the solenoid coil 102 of the solenoid control valve 86 is de-energized so that the plunger 100 is moved to a position to interrupt communication between the conduits 96 and 98 through the valve thereby to prevent supply of intake manifold vacuum to the second chamber 88b of the diaphragm assembly 84. Accordingly, the diaphragm member 90 is moved downwardly as viewed in FIG. 1 by the force of the compression spring 94 thereby causing the plunger 92 to rotate the throttle operating lever 82 clockwise for decreasing the degree of opening of the throttle valve 14. Thus, the throttle valve 14 is held in a position suitable for normal idling operation of the engine after the engine has been warmed up.

FIG. 2 illustrates another preferred example of the throttle opening device shown in FIG. 1 forming part of the warming-up system according to the present invention, the throttle opening device being generally represented by reference numeral 110. In this preferred example, the throttle opening device 110 is shown as comprising, in addition to the throttle operating lever 82, an operating device 112. The operating device 112 includes a casing 114 having an inlet communicating with the outlet port 18a of the cooling circuit 18 and an outlet communicating with the inlet port 18b of the cooling circuit 18 for circulating the warming-up coolant through the casing 114. The casing 114 has incorporated therein a temperature responsive means 116 which is held in contact with the coolant admitted to the casing 114 and responsive to the temperature of the coolant therein. The temperature responsive means 116 is connected at its one end to a connecting rod 118 connected to one end of the throttle operating lever 82 and also connected at its other end to a rod 120 which in turn is connected through a joint means 122 to one end of a lever 124. Indicated at 126 is a liquid seal which seals off the coolant from being drained to the atmosphere. The lever 124 is rotatably mounted on a shaft 128 and connected at its other end to an accelerator pedal 132 through a linkage 134. Indicated at 130 is a stop which prevents excessive rotation of the lever 124. With this arrangement, if the temperature of the coolant admitted into the casing 114 is low, then the temperature responsive means 116 contracts thereby tending to pull the rods 118 and 120 toward each other. However, the joint 122 holds the rod 120 stationary causing the rod 118 to move in a direction as shown by an arrow A in FIG. 2 and, therefore, the degree of opening of the throttle valve 14 is increased. When, however, the temperature of the coolant reaches a predetermined level, the temperature responsive means 116 expands to move the rod 118 in a direction opposite to the direction shown by the arrow A in FIG. 2 for thereby causing the throttle operating lever 82 to rotate the throttle valve 14 to a suitable position proper for normal idling operation of the engine. As the temperature of the coolant further increases beyond the predetermined level, the temperature responsive means 116 expands until it abuts against the inner walls of the casing 114 and, thereafter, the expansion of the temperature responsive means 116 is limited by the inner walls of the casing 114 whereby excessive leftward movement of the rod 118 is prevented. Thus, the opening degree of the throttle valve 14 is directly controlled in response to the temperature of the coolant admitted to the casing 114 from the cooling circuit 18 (see FIG. 1) and, when the temperature of the coolant is below the predetermined level, the opening degree of the throttle valve 14 is increased so that the engine is warmed up in a shortened period of time after the engine is started. The throttle opening device 110 shown in FIG. 2 is specifically suited for use in an internal combustion engine having a carburetor in which no connecting mechanism between the throttle valve and the choke valve is provided.

FIG. 3 illustrates still another preferred example of the throttle opening device which is specifically suited for use in an internal combustion engine having a carburetor in which a connecting mechanism is provided between the throttle valve and the choke valve. In this preferred example, the throttle opening device, indicated at 140, comprises a first arm member 142 having its one end fixedly connected to the rotatable shaft 14a of the throttle valve 14 and its other end connected to the lever 124 through a linkage 144. The first arm member 142 has an extension 142a laterally extending from the first arm member 142 at an intermediate portion thereof, which extension 142a is connected to a choke valve (not shown) through a mechanism adapted for preventing the choke valve from being closed. As shown, the first arm member 142 is also provided with a projection 142b which serves in a manner subsequently described. The throttle opening device 140 also comprises a second arm member 146 having one end freely rotatably mounted on the rotatable shaft 14a and its other end connected to an operating device 148. The second arm member 146 has a projection 146a which is engageable with the projection 142b. The operating device 148 includes a casing 150 which is mounted on a water jacket 152 of the engine, a temperature responsive means 154 disposed in the casing 150, and a movable pin 156 fixed to a free end of the temperature responsive means 154 and connected to the other end of the second arm member 146 in a one-way fashion, as shown. The temperature responsive means 154 is fixedly connected at its lower end to the bottom of the casing 150 so as to directly respond to the temperature of the coolant B in the water jacket 152. Indicated at 158 is a rubber cap which closes an open end of the casing 150. With this arrangement, if the temperature of the coolant B is below a predetermined level, then the temperature responsive means 154 contracts to pull the other end of the second arm member 146 downwardly as viewed in FIG. 3. In this instance, the projection 146a of the second arm member 146 causes the first arm member 142 to rotate counterclockwise so that the opening degree of the throttle valve 14 is increased. However, as the temperature of the coolant B in the water jacket 152 increases, the temperature responsive means 154 expands so that no force is applied on the other end of the second arm member 146 by the one-way connection of the pin 156 and the arm member 146. In this condition, the opening degree of the throttle valve 14 is determined by the position of the accelerator pedal (not shown).

Figure 4:
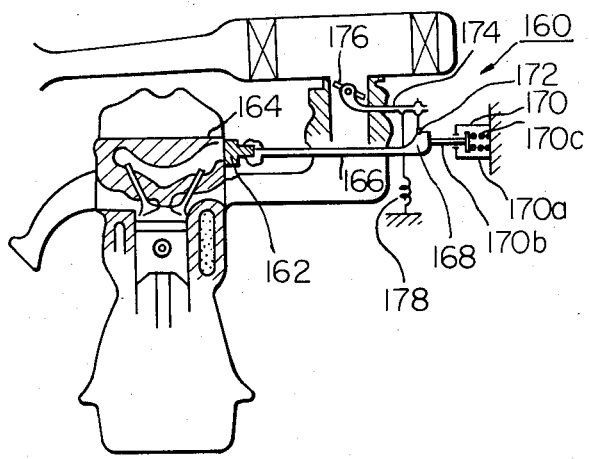
FIG. 4 is a schematic view illustrating an example of a choke and a choke operating mechanism to be incorporated in the warming-up system shown in FIG. 1.

Referring now to FIGS. 1, 2 and 3 the warming-up system of the present invention may further comprise a choke and a choke operating mechanism which is adapted to close the choke valve of the carburetor so that an enriched air-fuel mixture is supplied to the engine cylinder when the temperature of the coolant is low. An example of such choke operating mechanism is schematically shown in FIG. 4. As shown, the choke operating mechanism which is generally represented by reference numeral 160 comprises a thermostatically controlled operating device 162 which is mounted on a cylinder head 164 of the engine and which is connected to a rod 166 having one end provided with a cam portion 168 supported by a cam supporting unit 170, a cam follower 172 connected to a choke operating lever 174 adapted for rotating a choke valve 176, and a tension spring 178. The thermostatically controlled operating device 162 may be of the type which is shown in FIG. 3 (numeral 148) and serves to move the rod 166 leftwardly as viewed in FIG. 4 when the temperature of the coolant is at a low level. The cam supporting unit 170 has a casing 170a into which a rod 170b extends. The rod 170b has one end connected to the cam portion 168 and the other end biased by a compression spring 170c located in the casing 170a. With this arrangement, if the coolant temperature is low, then the thermostatically controlled operating device 162 moves the rod 166 leftwardly as viewed in FIG. 4 so that the cam follower assumes a position shown in FIG. 4. In this instance, the choke operating lever 174 is rotated counterclockwise against the force of the tension spring 178 and, consequently, the choke valve 176 is closed thereby supplying the engine with an enriched air-fuel mixture. As the temperature of the coolant increases, the thermostatically controlled operating device moves the rod 166 rightwardly as viewed in FIG. 4 against the force of the compression spring 170c of the cam supporting unit 170. In this instance, the cam follower 172 disengages the cam portion 168 so that the choke operating lever 174 is rotated clockwise by the force of the tension spring 178 hereby opening the choke valve 176. Thus, the choke valve 176 is controlled in dependence on the temperature of the coolant whereby the engine is satisfactorily warmed up while the performance efficiency of the engine is increased.

Figure 5:
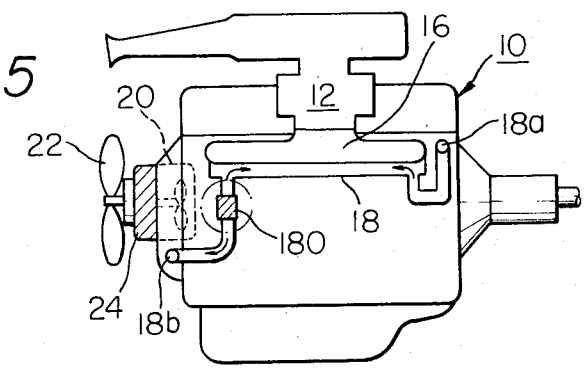
FIG. 5 is a schematic view illustrating another preferred embodiment of the warming-up system according to the present invention.
Figure 6:
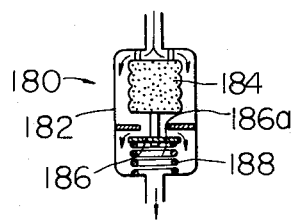
FIG. 6 is a cross sectional view showing a detail construction of a thermostatically controlled flow control valve shown in FIG. 5.

A modified form of the warming-up system according to the present invention is schematically illustrated in FIG. 5 wherein an electric circuit, an ignition timing change over device and a throttle opening device are omitted for the sake of simplicity of illustration. In this modified form, the cooling circuit 18 is arranged for the coolant to flush an exposed surface of the intake manifold 16 whereby the heated coolant is advantageously utilized for rapidly warming up the intake manifold 16 thereby to facilitate vaporization of fuel in the carburetor 12 to provide an air-fuel mixture of an optimum air-fuel ratio. This is reflected in a satisfactory combustion of the air-fuel mixture in the engine cylinder so that the performance efficiency of the engine is increased while the concentrations of noxious and harmful compounds in the engine exhaust gases are eliminated during warming-up of the engine. Moreover, the cooling circuit 18 is provided with a thermostatically controlled flow control valve 180 which controls the flow of cooling water circulated and recirculated through the cooling circuit 18. A detail construction of the flow control valve 180 is shown in FIG. 6. As shown, the flow control valve 180 comprises a casing 182 located in the cooling circuit 18, a temperature responsive bellows 184 operatively disposed in the casing 182, a valve plate 186 connected to the temperature responsive bellows 184 and having at least one small aperture 186a, and a compression spring 188 for biasing the valve plate 186. If the temperature of the coolant is at a low level, then the temperature responsive bellows 184 contracts so that the valve plate 186 is moved to its closing position. After the engine is started, the coolant is warmed up fast. The coolant thus warmed up is passed from the outlet port 18a through the cooling circuit 18 into the casing 182 of the flow control valve 180. In this instance, the cooling water is passed through the small aperture 186a formed in the valve plate 186 and, thereafter, the cooling water is recirculated into the water pump 20 through the inlet port 18b. Thus, the intake manifold 16 is satisfactorily warmed up by the heated coolant passing through the cooling circuit 18 whereby the vaporization of fuel is facilitated to provide an air-fuel mixture of optimum air-fuel ratio thereby providing maximum performance efficiency of the engine while decreasing the concentrations of noxious and harmful compounds in the engine exhaust gases. It is to be noted that the diameter of the aperture 186a should be properly selected so as to cause the heated coolant delivered to the cooling circuit 18 to satisfactorily warm up the intake manifold 16. This is because of the fact that, if the diameter of the aperture is too large, the cooling water is circulated through the cooling circuit in a large amount whereas, if the diameter of the aperture 186a is too small, the amount of recirculation of the cooling water is insufficient for warming up the intake manifold 16.

It will now be understood from the following description that the warming-up apparatus of the present invention is capable of warming up the engine in a significantly shortened period of time after the engine has been started. Thus, the time period required for moving the choke valve to its fully opened condition can be satisfactorily shortened whereby the concentrations of noxious and harmful compounds such as hydrocarbons and carbon monoxide contained in engine exhaust gases can be significantly reduced.

What is claimed is:

1. In an internal combustion engine having an intake manifold, a water pump adapted to circulate and recirculate a coolant through a cooling circuit, a cooling fan and a carburetor with a throttle valve, a warming-up system comprising, in combination, a source of d.c. voltage supply, a coolant temperature responsive switch associated with the engine and electrically connected to said source of d.c. voltage supply, said coolant temperature responsive switch being closed when the temperature of the coolant in the cooling circuit is below a predetermined level, a relay switch electrically connected through said coolant temperature responsive switch to said source of d.c. voltage supply, said relay switch being closed when said coolant temperature responsive switch is closed, an electro-magnetic clutch electrically connected to said relay switch and engaged when said relay switch is closed for stopping operations of said cooling fan and said water pump, a timer relay electrically connected to said coolant temperature responsive switch, an ignition timing changeover device comprising a retarding breaker contact assembly connected through said timer relay to an ignition coil and an advancing breaker contact assembly directly connected to said ignition coil, said timer relay being closed to actuate said retarding breaker contact assembly to retard ignition timing when said coolant temperature responsive switch is closed; and a throttle opening device responsive to the temperature of the coolant, said throttle opening device increasing the opening degree of said throttle valve when the temperature of the coolant is below said predetermined level.

2. A warming-up system as claimed in claim 1, wherein said throttle opening device comprises a throttle operating lever fixedly connected to a rotatable shaft of said throttle valve, a diaphragm assembly having a flexible diaphragm member and a plunger fixed to said flexible diaphragm member and movable therewith, said movable plunger abutting on said throttle operating lever, conduit means connecting said diaphragm assembly to said intake manifold for supplying intake manifold vacuum thereto, and a solenoid control valve disposed in said conduit means and having its solenoid coil electrically connected to said coolant temperature responsive switch, said solenoid coil being energized to open said solenoid control valve when said coolant temperature responsive switch is closed, whereby said conduit means is opened to supply said intake manifold vacuum to said diaphragm assembly to move said diaphragm member and accordingly said movable plunger to a position to cause said throttle operating lever to increase the opening degree of said throttle valve.

3. A warming-up system as claimed in claim 1, wherein said throttle opening device comprises a throttle operating lever fixedly connected to a rotatable shaft of said throttle valve, and an operating device connected to said throttle operating lever, said operating device including a casing having an inlet communicating with an outlet port of said cooling circuit and an outlet communicating with an inlet port of said cooling circuit, and a temperature responsive means disposed in said casing, said temperature responsive means contracting when the temperature of the coolant is below said predetermined level, whereby said temperature responsive means rotates said throttle operating lever to increase the opening degree of said throttle valve.

4. A warming-up system as claimed in claim 1, wherein said throttle opening device comprises a first arm member fixedly connected to a rotatable shaft of said throttle valve and having a projection, a second arm member freely rotatably mounted on said rotatable shaft and having a projection which abuts on the projection of said first arm member, and an operating device connected to said first arm member for controlling the opening degree of said throttle valve in response to the temperature of the coolant, said operating device including a casing mounted on a water jacket of said engine, a temperature responsive means located in said casing and operatively connected to said second arm member, said temperature responsive means being responsive to the temperature of the coolant in said water jacket, whereby when the temperature of the coolant is below said predetermined level, said temperature responsive means contracts to rotate said second arm member to cause the projection of said second arm member to push said projection of said first arm member for thereby increasing the opening degree of said throttle valve.

5. A warming-up system as claimed in claim 1, wherein said cooling circuit is arranged for the coolant to flush an exposed surface of said intake manifold of said engine for warming up said intake manifold of said engine by a warm coolant passing through said cooling circuit.

6. A warming-up system as claimed in claim 5, further comprising a flow control valve located in said cooling circuit for controlling the flow of the coolant circulated and recirculated through said cooling circuit.

* * * * *